United States Patent [19]
Buttner

[15] 3,659,863
[45] May 2, 1972

[54] AUTOMATIC DRILL CHUCK AND SPLIT COLLET

[72] Inventor: Horace J. Buttner, 1501 Palos Verdes Dr., North, Harbor City, Calif. 90710

[22] Filed: Oct. 7, 1969

[21] Appl. No.: 864,395

[52] U.S. Cl.................................................279/4, 279/50
[51] Int. Cl.............................................................B23b 31/30
[58] Field of Search............................279/4, 41, 43, 50, 57

[56] References Cited

UNITED STATES PATENTS

| | | | |
|---|---|---|---|
| 2,372,592 | 3/1945 | Lovely | 279/4 |
| 3,396,980 | 8/1968 | Muller | 279/4 X |
| 2,383,094 | 8/1945 | Walder | 279/4 |
| 3,544,120 | 12/1970 | Stamm | 279/4 |
| 3,208,759 | 9/1965 | Firestone et al. | 279/4 |

Primary Examiner—Andrew R. Juhasz
Assistant Examiner—James F. Coan
Attorney—William D. Hall, Elliott I. Pollock, Fred C. Philpitt, George Vande Sande, Charles F. Steininger and Robert R. Priddy

[57] ABSTRACT

A fluid operated chuck includes drive means having an annular groove formed therein. A fluid actuated collet engaging means engages an associated collet. A novel segmented collet includes a plurality of separate spaced portions having a tapered outer surface which cooperates with a tapered surface on the collet engaging means. Each of these collet portions has a radially outwardly extending flange at the inner end thereof which fits within the annular groove in the drive means for retaining the segmented collet in position. A generally cylindrical longitudinally split inner collet fits snugly within the segmented collet. A locating ring can also be disposed within the segmented collet, this locating ring having a central threaded hole formed therein. Pin means may also be provided between the collet portions for maintaining them in operative spaced relationship to one another. These pins can be carried by the drive means or the locating ring. A modified form of chuck includes a pair of pistons one of which is slidable upon the other, the pistons being movable in opposite directions to operate an associated collet. Fluid is introduced around the pistons to form a fluid bearing for the pistons and further to urge the pistons away from one another.

24 Claims, 7 Drawing Figures

INVENTOR
HORACE J. BUTTNER

Patented May 2, 1972 3,659,863

INVENTOR
HORACE J. BUTTNER

Patented May 2, 1972

INVENTOR
HORACE J. BUTTNER

INVENTOR
HORACE J. BUTTNER

AUTOMATIC DRILL CHUCK AND SPLIT COLLET

BACKGROUND OF THE INVENTION

The fluid operated chuck of the present invention was originally designed to solve the problem of drilling hinge pin holes in hinges for aircraft that may be as long as 20 feet in length. In deep hole drilling, a reciprocating pecking action is required to withdrawn chips as drilling proceeds. Means must be provided to feed extended length drills through the drill spindle or to move the drillhead attached to the end of the drill rod towards the part being drilled. In the latter case, drill tables twice as long as the part being drilled must be provided as well as movable members that prevent rod whip and which must be telescoped, removed or collapsed as drilling proceeds. In the former case, a mechanical chuck consisting of a planet gear assembly actuated by restraining a knurled outer surface from rotating by grasping it by hand to release the chuck from its grip on the drill rod may be provided so that the drill head can retract a short distance such as about 3 inches, whereupon the chuck can be reengaged to repeat the drilling cycle. This type of operation is excessively expensive, requiring one man for each drill head. Operators' hands are often injured from grasping the knurled surface which is rotating at high speeds. Furthermore, such a mechanical chuck usually has only a few hours of useful life before failure occurs.

In addition, many problems are encountered when using conventional collets for gripping a long drill rod. Conventional collets are screwed in place with difficulty and are even more difficult to remove because of the flimsy construction and inability to grip the collet for removal. Also, when the collet fits loosely, it frequently becomes unscrewed with the inertia and vibration that is developed.

A further difficulty occurs with the utilization of conventional collets due to inaccurate axial positioning of the collet. Such inaccurate positioning can render the chuck inoperative since the fluid actuated piston thereof may be positioned so that the seals associated therewith do not function thereby permitting the loss of fluid pressure. When this happens, the collet cannot be urged into engagement with an associated drill or the like.

Improper axial positioning of conventional collets also prevents boring to precise controlled depths as is required in certain applications.

Threaded collets also require an excessive amount of time to replace when it is desired to grip tools of another size or configuration. This becomes important when the chuck is employed in a tape or numerically controlled machine wherein the cost of operation for a given time period is quite high. The advantage of automatic chucks to change tools instantly such as drills with identical shanks, without stopping the spindle, is nullified to a certain degree by the length of time required to change a collet when the tool diameter is changed.

The present invention is also directed to an improved form of chuck which may be miniaturized to form a construction suitable for extremely high speed drilling operations. In conventional arrangements, the thrust of the fluid operated piston which operates the chuck is opposite to that of the drilling thrust. In high speed applications, the drill heads may not be capable of handling such reversed forces. It accordingly becomes desirable to provide a balanced design to eliminate this problem. Such miniaturized designs can be employed for example in drilling printed circuit boards for computers and the like.

SUMMARY OF THE INVENTION

In the chuck of the present invention, a drive means is mounted within a housing for rotation with respect thereto and is adapted to be connected with the spindle or drive shaft of a drill head. The drive means includes an annular groove defining a load reaction shoulder. A fluid actuated collet engaging means is provided for engaging and operating the associated collet.

The novel segmented collet of the present invention includes a plurality of separate spaced portions having a tapered outer surface which cooperates with a tapered inner surface on the collet engaging means for moving the collet into operative relationship with respect to a tool and the like.

Each of the spaced portions of the segmented collet has a radially outwardly directed flange formed at the inner end thereof. These flanges are adapted to fit within the groove formed in the drive means, the flanges defining a shoulder engageable with the load reaction shoulder on the drive means to retain the collet portions in operative position.

This arrangement eliminates any threads on the collet and proper axial positioning is provided by the cooperating flanges on the collet portions and the groove formed in the drive means. Axial forces applied to the collet members members will of course be transmitted from the flange to the load reaction shoulder formed on the drive means.

The various collet segments are obtained by slitting a geometrically round machined collet, and accordingly the collet portions can be collapsed sufficiently to be inserted into the bore of the drive means, this bore being essentially that of the non-collapsed outer cylindrical surface of the collet.

When the portions of the collet are bottomed axially in the drive means, they are expanded so that the flanges thereof extend into the annular groove formed in the drive means. Means is then inserted within the collet portions having an outer diameter essentially equal to the inner bore defined by the various portions of the collet when in expanded condition, thereby locking the flanges of the collet portions in place.

In order to enable a quick change of diameter for various tool shank configurations, an inner collet is provided within the segmented collet. This inner collet comprises a generally cylindrical body which is split longitudinally thereof, this longitudinal split extending only partially throughout the length of the inner collet. The inner end of the inner collet is unsplit and cylindrical for holding the segmented collet in its fully expanded operative position. The inner end of the inner collet may also be split in a plane disposed 90° from the plane of the longitudinal split in the outer end thereof.

With this arrangement, the segmented collet does not have to be removed from the associated chuck, and the inner collet only need be removed for accommodating different size tools. The inner collet is less costly and can be more readily inserted into and removed from operative position. Additionally, in the interest of saving time, the tools can be inserted within an associated inner collet, and the tool and inner collet can be simultaneously placed within the segmented collets.

While the segmented collet of the present invention is illustrated as comprising four separate portions, the number of portions can comprise two or more. The inner collet is illustrated as being split diametrically thereof, but it should also be understood that one or more slots therein can be employed for providing the desired resiliency thereto.

A locating ring may also be provided within the segmented collet for holding it in operative position. This locating ring is a generally cylindrical body which fits snugly within the various portions of the segmented collet, the outer periphery of the locating ring being such as to hold the segmented collet firmly in operative position. This locating ring is primarily provided for the purpose of holding the portions of the segmented collet in position when the inner collet is removed for any reason such as replacement with an inner collet for a different size drill. This locating ring is provided with a central threaded hole to facilitate removal of the locating ring.

It is also important to provide uniform circumferential spacing of the various portions of the segmented collet for obtaining balance at high speeds of rotation. In order to assure such proper spacing, a plurality of pins are disposed between the collet portions and in engagement therewith. These pins are radially disposed and may be carried either by the locating ring disposed within the segmented collet or by the drive means disposed in surrounding relationship to the segmented collet. Such pins could also be supported by the inner end of the inner collet, although this arrangement is not considered preferable since the inner collet may be removed from time to time.

When the pins are carried by the drive means, they not only serve to properly space the portions of the segmented collet, but also provide driving torque to the collet portions.

The present invention also contemplates a novel fluid operated chuck which may readily be adapted for use in extremely high speed drilling operations. This form of fluid operated chuck employs a dual piston arrangement wherein one piston is journaled on another, the two pistons moving in opposite directions for operating the associated chuck. Axial forces other than drill end thrust are prevented from being transmitted to the bearing assembly carrying the primary spindle or drive shaft that drives the chuck.

This form of the invention also incorporates an arrangement wherein the fluid for operating the dual piston arrangement is introduced about the pistons in such a manner as to form a fluid bearing therewith. The fluid may comprise air so that the air provides not only the piston actuating force for the chuck but also forms a film for supporting small lateral forces such as unbalanced rotary forces.

The chuck accordingly incorporates air bearings whereby no speed limitation would apply as with other bearings. No high speed rotating seals are required, no oil contamination occurs, friction is almost zero and heating is substantially eliminated. By utilizing the journals as pistons, the utmost in simplicity is provided with only one fluid such as air being required.

Hydrodynamic pressure is not relied upon for generating the fluid forces with high rotational speeds, but rather a static pressure is employed of greater load supporting ability. This is important since the journals or pistons will be supported before rotation starts so that no transitional rubbing of metal will occur before speeds are high enough for fluid support.

Radial clearance between the pistons and the sleeve bearing should be held to a minimum, with 0.0002 desired, since the pistons must also function as journals, rotating within the bearing. Close clearance provides maximum support by the air film and minimum airflow. Maximum hardness of bearing surfaces is also provided to minimize occasional contact damage when lateral forces may be greater than the air film will support.

Oil can also be used instead of air in applications where seals and a recirculating system can be incorporated. Accordingly, the term fluid includes oil as well as air.

The present invention also includes the novel combination of a motor having an output spindle, a fluid operated chuck being operatively associated with the outer end of the spindle, and means providing a fluid bearing for both the spindle and the rotatable portion of the fluid operated chuck. This enables very high speeds on the order of 54,000 rpm to be obtained with extremely long life expectancy while eliminating the need for any coupling or quill drive.

DESCRIPTION OF THE PREFERRED EMBODIMENTS

Figure 1:
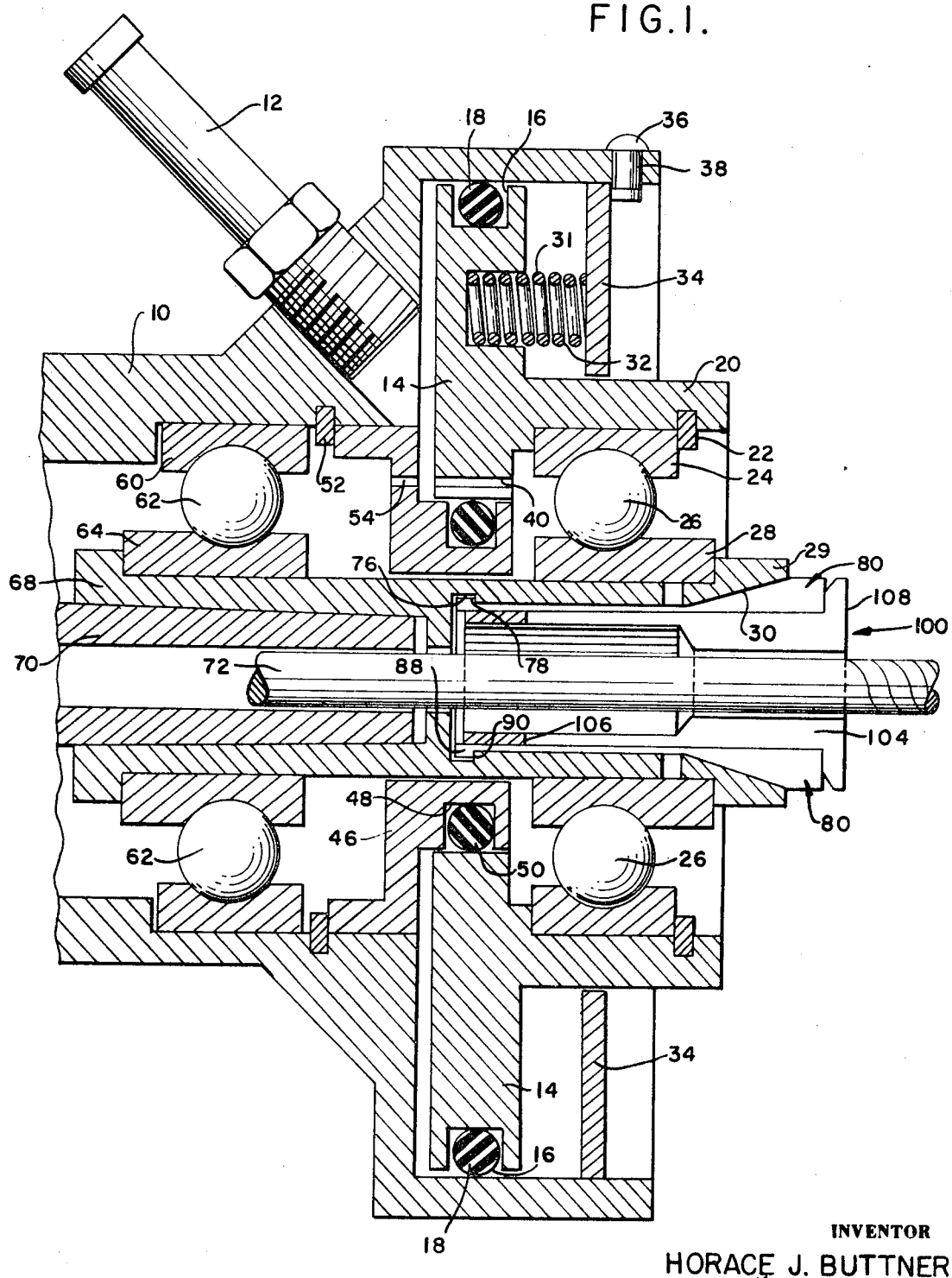
FIG. 1 is a longitudinal section through a fluid operated chuck having the novel collet means of the present invention disposed therein.

Referring now to the drawings wherein like reference characters designate corresponding parts throughout the several views, a fluid operated chuck is illustrated in FIG. 1 including a housing 10 which may have a partially split section (not shown) adapted to clamp onto a non-rotating part of an associated drill head in a conventional manner.

A nipple 12 is threaded into a suitable hole provided in the housing, this nipple being connected with a suitable source of fluid such as air under pressure, valve means being provided in this connection for controlling the flow of air to and from the chuck.

An axially reciprocable piston 14 is slidably mounted within the housing, this piston having a peripheral groove 16 extending therearound which receives an O-ring seal to provide an effective fluid tight seal with the interior of the housing.

The piston includes a forwardly extending annular portion 20 having a retaining ring 22 supported within a groove formed therein, this retaining ring serving to hold the outer race 24 of an outboard bearing in place within the piston. This outer race has a light press fit in the piston. Ball bearings 26 are disposed between outer race 24 and an inner race 28.

An annular collet engaging member or nosepiece 29 is pressed onto the inner race 28 of the outboard bearing and has a tapered substantially frusto-conical inner surface 30 for a purpose hereinafter described.

Piston 14 has a plurality of spaced recesses 31 formed therein, each of which receives a compression spring 32 which bears against an annular reaction member 34. Member 34 bears against a plurality of loose rivet-like pins 36 having a reduced central portion 38 received within holes provided in housing 10. These pins permit fast removal of the components of the chuck without the necessity of providing special tools.

The volume of the space between housing 10 and piston 14 for receiving fluid pressure is kept to a minimum to permit fast retraction of the piston when the supply of fluid is shut off and fluid is exhausted from this space. In order to enable rapid retraction of the piston, light springs 32 are provided with predetermined loads which force the piston to the left as seen in the drawings.

A small hole 40 extends axially through piston 14 and is in communication with fluid introduced into the chuck so that the outboard bearing previously described is lubricated during use. Oil is provided along with the air supply to provide an oil and air mist which impinges on the bearing during operation of the apparatus.

An adapter ring 46 has a peripherally extending groove 48 formed therein which receives an O-ring seal 50 which provides a fluid tight seal with the inner periphery of piston 14.

A retaining ring 52 is seated within a peripheral groove provided within housing 10 and engages the left-hand edge of adapter ring 46 to limit movement of the adapter ring toward the left as seen in the drawing. A small passage 54 extends through the adapter ring and is adapted to permit an air and oil mist to lubricate the inboard bearing hereinafter described.

The inboard bearing includes an outer race 60 having a light press fit in outer housing 10. Ball bearings 62 are disposed between the outer race 60 and an inner race 64, this race being pressed onto an adapter shaft or drive means 68. This drive means is locked on the tapered end of the drive spindle 70 of conventional construction. This drive spindle is tubular and is adapted to receive a portion of a drill 72 therewithin.

The inner race 28 of the outboard bearing has a sliding fit on drive means 68 to permit axial movement of the outboard bearing in accordance with movements of piston 14.

The inner surface of drive means 68 is provided with a groove 76 extending around the inner periphery thereof, this groove including a radially extending load reaction shoulder 78 for a purpose hereinafter described.

Figure 2:
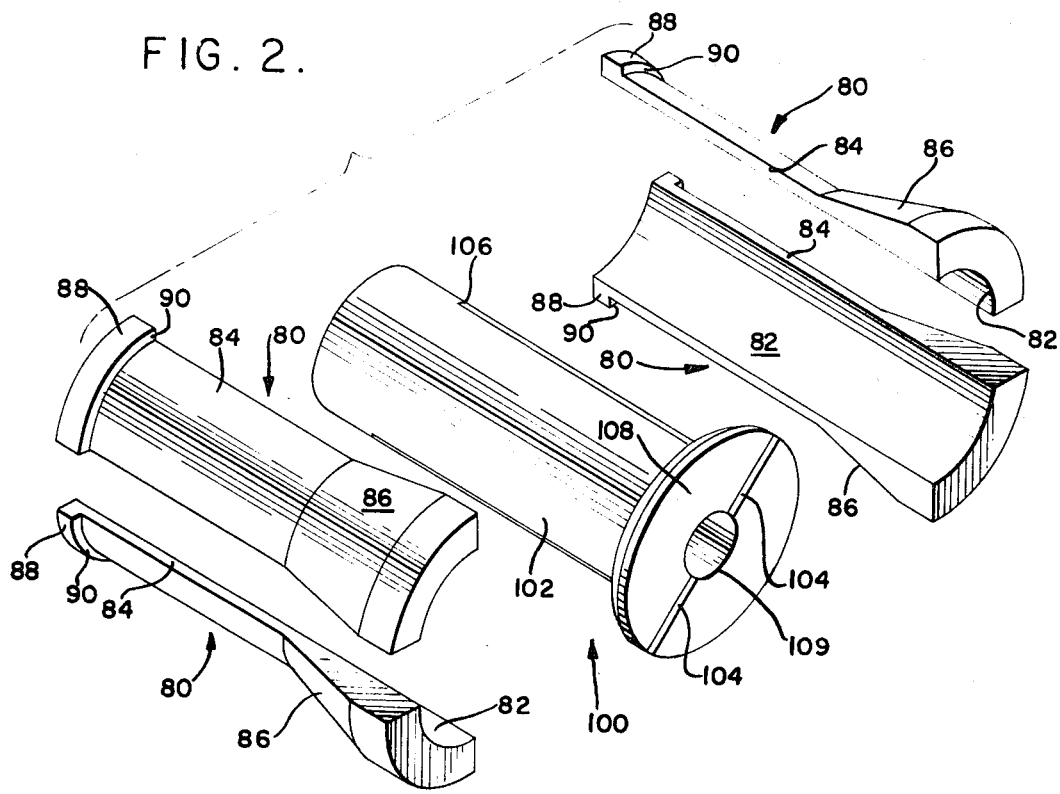
FIG. 2 in an enlarged perspective exploded view illustrating the segmented collet and inner collet of the present invention.

Referring now to FIG. 2 of the drawings, the novel segmented collet of the present invention is illustrated. This segmented collet includes a plurality of similar separate spaced portions 80 illustrated as being four in number. The portions extend through an arc sufficient to provide spaces between the individual collet portions so that they do not ordinarily directly engage one another during use.

Each of these collet portions is generally curved in cross section and includes an inner surface 82 defining a portion of a cylindrical surface. Each collet portion includes a substantially cylindrical portion 84 from which extends a tapered outer surface 86 which forms a portion of a frusto-conical surface. These surfaces 86 are complementary to the inner surface 30 of nosepiece 29, whereby upon outward movement of the nosepiece, interengagement of such surfaces causes the various collet portions to be moved inwardly to clamp a drill or the like in operative position.

At the inner end of each of the collet portions, a radially outwardly extending flange 88 is provided, this flange defining a radially extending shoulder 90 adapted to engage the aforementioned load reaction shoulder 78 formed in drive means 68 of the chuck.

The segmented collet is illustrated in operative position within the chuck as seen in FIG. 1, it being noted that the flanges 88 of the various collet portions are seated within annular groove 76 in drive means 68, and shoulders 90 of each of the collet portions are in engagement with the load reaction shoulder 78 formed in the drive means.

As seen in FIG. 2, an inner collet is indicated generally by reference number 100, this inner collet including a substantially cylindrical body portion 102 which is provided with a longitudinally extending diametrical slot 104 extending from the outer end thereof to a point 106 spaced from the inner end thereof. Accordingly, the inner end of the inner collet is continuous in a circumferential direction. The inner end of the inner collet may also be split in a plane disposed 90° to the plane of slot 104. A radially outwardly directed peripherally extending flange 108 is provided at the outer end of inner collet 100 for positively positioning the inner collet with respect to the segmented collet previously described. The flange at the outer end of the inner collet may be eliminated in some cases and a circumferential groove may be provided in the outer surface of the outer end of the inner collet to facilitate removal thereof. The inner collet has a central bore 109 formed longitudinally therethrough for receiving a drill or the like.

As seen in FIG. 1, the inner collet fits snugly within the portions of the segmented collet for retaining the segmented collet in the operative position shown whereby the flanges at the inner ends of the segmented collet portions are retained in the groove provided in the drive means. It is apparent that when piston 14 moves to the right carrying nosepiece 29 to the right, the inner surface 30 of the nosepiece cooperates with the sloping surfaces 86 on the various segmented collet portions to urge these collet portions inwardly thereby clamping the resilient inner collet 100 onto the associated tool.

Figure 3:
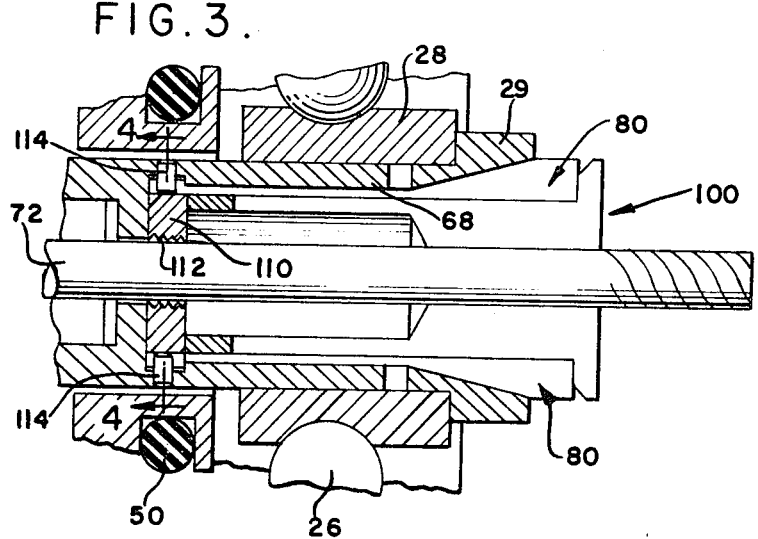
FIG. 3 is a view of a portion of the chuck shown on FIG. 1 incorporating spacer pins and a locating ring within the segmented collet.
Figure 4:
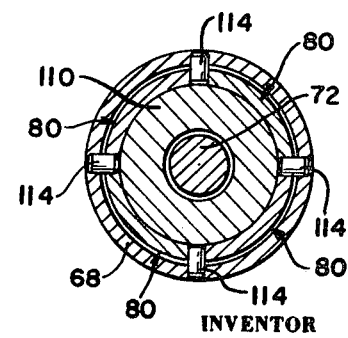
FIG. 4 is a sectional view taken substantially along line 4—4 of FIG. 3 looking in the direction of the arrows.

Referring now to FIGS. 3 and 4 of the drawings, a modification of the invention is illustrated. The chuck is of substantially the same construction as previously described as well as the segmented collet and the inner collet. In this modification, the inner collet does not extend as far to the left axially as the inner collet shown in FIG. 1, and a locating ring 110 is positioned axially inwardly of the inner end of the inner collet. This locating ring is a generally cylindrical body which fits snugly within the portions of the segmented collet to retain a segmented collet in the operative position illustrated. A central threaded hole 112 is provided through the locating ring to facilitate removal thereof.

Also shown in FIGS. 3 and 4 is a further feature of the present invention wherein a plurality of pins 114 are provided for maintaining the various portions of the segmented collet in proper spaced relationship with respect to one another. Pins 114 extend substantially radially of the apparatus, four of these pins being provided and extending between and engaging the four collet portions.

As shown in FIGS. 3 and 4, pins 114 are carried by drive means 68 whereby the pins serve the dual function of spacing the segmented collet portions with respect to one another and also to transmit drive torque to the segmented collet from the drive means.

Pins 114 can also be carried by locating ring 110 as hereinafter described. It should be understood that it is not necessary to employ the locating ring in combination with the radially extending pins, and that these two features have been shown together for the purpose of illustration. The locating ring and the pins may be used either along or in combination with one another as desired.

It should also be understood that the segmented collet may directly clamp a drill or other object, or as illustrated in the drawings, the segmented collet can clamp a tool through the intermediary of the split resilient inner collet which is collapsed on the tool.

Figure 5:
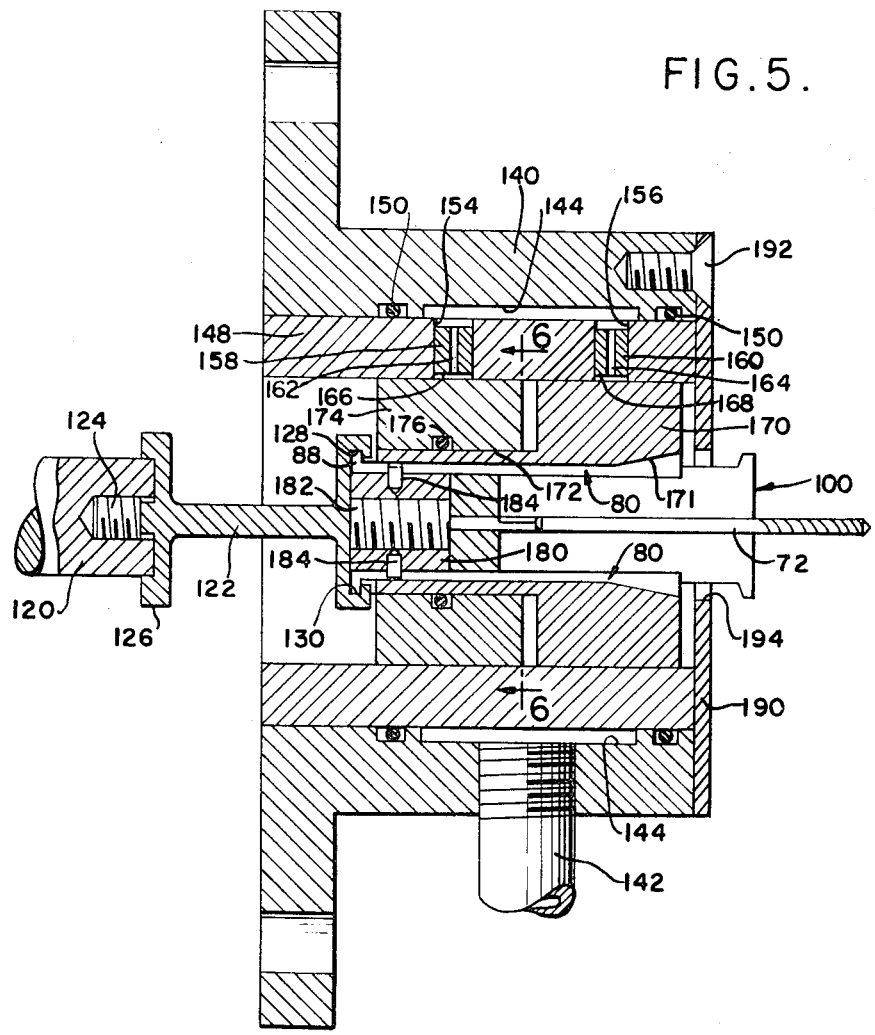
FIG. 5 is a longitudinal section through a modified form of fluid operated chuck according to the present invention.
Figure 6:
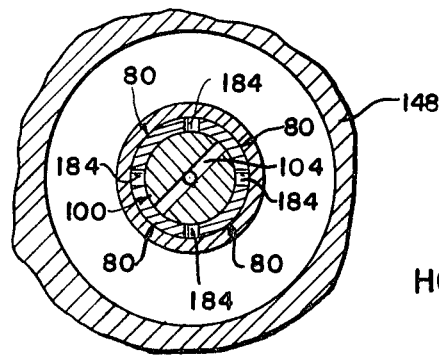
FIG. 6 is a sectional view taken substantially along line 6—6 of FIG. 5 looking in the direction of the arrows.

Referring now to FIGS. 5 and 6 of the drawings, a further modified form of the invention is illustrated. A motor shaft 120 is connected with a flexible drive member 122 having a threaded portion 124 threaded into a correspondingly threaded hole provided in the end of the motor shaft. Drive member 122 includes a cup-shaped portion 126 which pilots on the outer diameter of the motor shaft to maintain accurate radial location. The opposite end of drive 122 includes a cup-shaped portion 128 having a groove 130 extending around the inner periphery thereof, this groove corresponding to the groove 78 previously described for retaining a segmented collet in operative position within the chuck.

Flexible drive member 122 can flex to accommodate minute misalignment between the chuck and the center of the motor drive shaft without exceeding the hydrodynamic force capability of the fluid bearings hereinafter described.

A housing 140 is provided with a connection 142 in communication with a suitable source of fluid such as air under pressure. Fitting 142 is in communication with an annular groove 144 formed in the inner surface of housing 140. A sleeve 148 is fitted within the housing, and a pair of O-ring seals 150 disposed within suitable grooves provided in the housing form a fluid tight seal between the housing and sleeve 148.

Sleeve 148 is provided with two annular rows of circumferentially spaced radial holes 154 and 156 having plugs 158 and 160 disposed therein and provided with passages 162 and 164 respectively formed therethrough, these passages being in communication with annular spaces 166 and 168 respectively disposed inwardly thereof. Additional radial passages may be provided midway between passages 162 and 164 to provide more air to actuate the pistons hereinafter described and to provide better air support for the pistons where greater clearance is provided between the pistons and the surrounding sleeve.

A first piston 170 is mounted for rotation within sleeve 148 and for axial movement with respect thereto. Piston 170 has an inner tapered surface 171 complementary to the outer tapered surfaces formed on a cooperating segmented collet. Piston 170 also includes an annular extension 172 upon which is supported a second piston 174. Piston 174 is also adapted to rotate with respect to sleeve 148 and is slidable axially with respect thereto. An 0-ring seal 176 is provided within a suitable groove provided in the inner surface of piston 174 for providing a fluid tight seal between the two pistons.

A segmented collet similar to that previously described is employed with this chuck, the collet sections 80 receiving an inner collet 100 therewithin similar to the inner collet previously described. A generally cylindrical locating ring 180 is provided with a threaded central hole 182. A plurality of pins 184, shown as being four in number, extend radially outwardly of the locating ring and are disposed between and in engagement with the portions of the segmented collet to retain these portions in proper spaced relationship with respect to one another.

A thin plate 190 is secured to the right-hand end of housing by a plurality of screws 192, this plate having a central hole 194 formed therethrough. The plate protects the journal or bearing surfaces from drill chips or dirt and further directs air leakage onto the collet portions to continuously purge them of chips or dirt.

Pistons 170 and 174 serve not only as a fluid actuated collet engaging means but also as journals to support the collet for rotation within the surrounding housing.

Driving member 122 provides a friction drive as seen in FIG. 5 with the segmented collet to intentionally obtain slip in case rubbing of the pistons should be a problem. Pins 184 as shown in FIG. 5 serve only as spacing elements and not as driving elements as shown in FIG. 3.

The segmented collet portions are friction-locked in groove 130 of drive member 122 by the force of piston 174 which moves to the left and engages the friction drive member and piston 170 which moves to the right and engages the segmented collet portion to bias the collet inwardly to clamp a drill or the like.

It will be noted that passages 162 and 164 through which fluid is introduced to the pistons are disposed adjacent the longitudinal midpoints of the pistons. As the pistons are displaced away from particular passages 162 and 164, axial resistance to air flow along the pistons decreases in the immediate region of such particular passages. Flow through the passages, however, is restricted. On the other side of the pistons at 180° from the particular passages referred to above, decreased clearance between the piston and the sleeve results in a greater pressure drop axially and thus builds up a pressure to restore the journal towards its central position. Annular spaces 166 and 168 are necessary in order to decrease air turbulence and uncontrolled gyrations of the piston.

Figure 7:
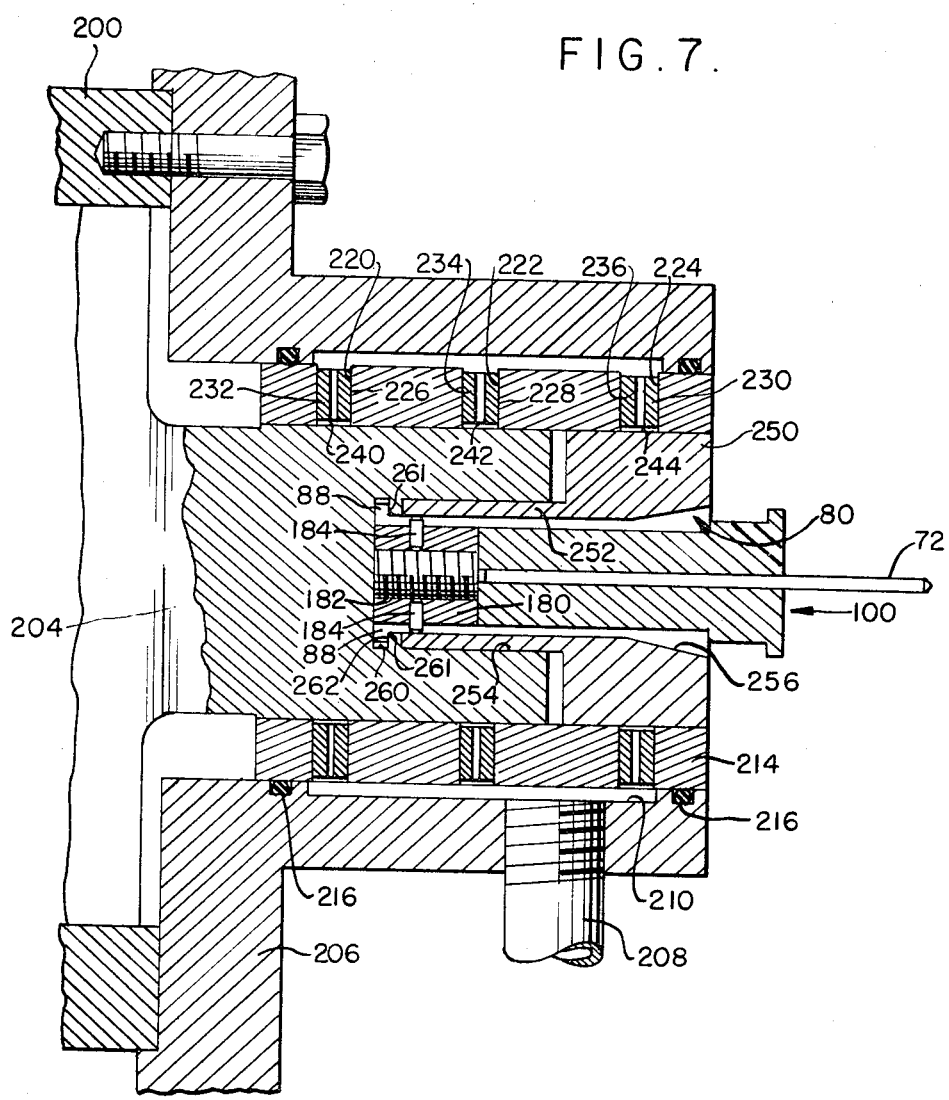
FIG. 7 is a longitudinal sectional view of still a further modified form of the invention.

Referring now to FIG. 7 of the drawings, a still further modified form of the invention is illustrated. A housing 200 is provided within which is supported an electric motor as commonly employed for operating drills and the like. The motor is provided with an output spindle 204.

An end plate or bearing housing 206 is suitably secured to housing 200 and is provided with a connection 208 in communication with a suitable source of fluid such as air under pressure. Fitting 208 is in communication with an annular groove 210 formed in the inner surface of housing 206. A bearing sleeve 214 is fitted within the housing, and a pair of 0-ring seals 216 disposed within suitable grooves provided in the housing form a fluid-type seal between the housing and sleeve 214.

Sleeve 214 is provided with three annular rows of circumferentially spaced radial holes 220, 222 and 224 having plugs 226, 228 and 230 disposed therein. Plugs 226, 228 and 230 are provided with passages 232, 234 and 236 respectively formed therethrough, these passages being in communication with annular spaces 240, 242 and 244 respectively disposed inwardly thereof.

The fluid operated chuck includes a piston 250 which is rotatable with respect to the sleeve and axially movable with respect thereto. Piston 250 includes a tubular reduced portion 252 which is slidably received within a bore 254 formed in the outer end of the motor spindle. Piston 250 has an inner tapered surface 256 complementary to the outer tapered surfaces formed on a cooperating segmented collet.

A segmented collet similar to that previously described is employed with this construction, the collet sections 80 receiving an inner collet 100 therewithin similar to the inner collet previously described. A generally cylindrical locating ring 180 is provided with a threaded central hole 182. A plurality of pins 184 extend radially outwardly of the locating ring and are disposed between and in engagement with the portions of the segmented collet to retain these portions in proper spaced relationship with respect to one another.

The radially outwardly extending flanges 88 at the inner end of the collet portions are received within an annular groove 260 formed within the motor spindle, this annular groove defining a load reaction shoulder 261 which engages a shoulder 262 formed on the radially outwardly extending flange on each of the collet portions.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A fluid operated chuck comprising a housing, drive means mounted within said housing for rotation with respect thereto and adapted to be connected with a drive shaft, fluid actuated collet engaging means supported within said housing for engaging an associated collet, said fluid operated collet engaging means including first and second pistons axially movable in opposite directions, and means for introducing fluid into a space between said pistons, said first piston being tubular and having a first external substantially cylindrical surface providing a journal surface, said first piston having an annular extension of a diameter less than said first external surface, said first piston having a bore formed therethrough and including a tapered portion and a substantially cylindrical portion concentric to said first external surface, said second piston being tubular and slidably mounted on said annular extension, said second piston having a second external substantially cylindrical surface substantially similar to said first external surface to provide a journal surface whereby in combination said first and second external surfaces are adapted to journal the collet engaging means within the housing, said first piston being axially movable to engage the tapered portion of said bore with a mating surface on a collet, the substantially cylindrical portion of said bore being adapted to accurately radially position the full length of the cylindrical portion of an associated collet.

2. A fluid operated chuck comprising a housing, drive means mounted within said housing for rotation with respect thereto and adapted to be connected with a drive shaft, fluid actuated collet engaging means supported within said housing for engaging an associated collet, said fluid operated collet engaging means including first and second pistons movable in opposite directions, and means for introducing fluid between said pistons comprising means for introducing fluid around said pistons to provide a fluid bearing for each of said pistons.

3. Apparatus as defined in claim 2 wherein the means for introducing fluid around said pistons comprises fluid inlet means substantially surrounding each piston and being disposed adjacent the medial portion of each of said pistons.

4. Apparatus as defined in claim 3 wherein said fluid inlet means comprise a plurality of individual substantially radial passages.

5. Apparatus as defined in claim 4 including an annular space disposed between the inner ends of said individual radial passages of each fluid inlet means and the outer periphery of the associated piston.

6. A fluid operated chuck comprising a housing, drive means mounted within said housing for rotation with respect thereto and adapted to be connected with a drive shaft, fluid actuated collet engaging means supported within said housing for engaging an associated collet, said fluid operated collet engaging means including first and second pistons movable in opposite directions, and means for introducing fluid between said pistons, said drive means including a space to receive collet portions, and a segmented collet including a plurality of separate spaced portions, each of said collet portions having on the inner end thereof a radially outwardly extending portion received within said space in the drive means for retaining the collet portions in operative position.

7. Apparatus as defined in claim 6 wherein the space in the drive means comprises an annular groove defining a load reaction shoulder, the radially outwardly extending portion on each of said collet portions comprising a radially outwardly extending flange defining a shoulder engaging said load reaction shoulder.

8. In combination, a motor having an output spindle, a fluid operated chuck including a fluid actuated piston supported for axial movement toward and away from said spindle for engaging an associated collet, and means for introducing fluid into a space between said spindle and said piston for actuating said piston, said piston being tubular and having a first external substantially cylindrical surface providing a journal surface, said piston having a bore formed therethrough and including a tapered portion and a substantially cylindrical portion concentric to said first external surface, said piston having an annular extension of a diameter less than said first external surface, said spindle having a bore formed therein slidably receiving said annular extension, said spindle having a second external substantially cylindrical surface substantially similar to said first external surface to provide a journal surface, whereby in combination said first and second external surfaces are adapted to journal the spindle and piston within a housing, said piston being axially movable to engage the tapered portion of said bore with a mating surface on a collet, the substantially cylindrical portion of said bore being adapted to accurately radially position the full length of the cylindrical portion of an associated collet.

9. Apparatus as defined in claim 8 wherein said means for introducing fluid between said spindle and said piston comprises means for introducing fluid around said spindle and said piston to provide a fluid bearing therefor.

10. Apparatus as defined in claim 9 wherein said piston includes a portion slidably supported by said spindle.

11. Apparatus as defined in claim 10 wherein said portion of the piston is tubular and is slidably received within a bore formed in said spindle.

12. Apparatus as defined in claim 9 wherein the means for introducing fluid around said spindle and said piston comprises fluid inlet means substantially surrounding said spindle and said piston.

13. Apparatus as defined in claim 12 wherein said fluid inlet means comprise a plurality of individual substantially radial passages.

14. Apparatus as defined in claim 13 including an annular space disposed between the inner ends of said individual radial passages of each fluid inlet means and the outer periphery of the adjacent component.

15. Apparatus as defined in claim 8 wherein said spindle has a bore formed therein and defines a space for receiving collet portions, a segmented collet including a plurality of separate spaced portions, each of said collet portions having on the inner end thereof a radially outwardly extending portion received within said space in the drive spindle for retaining the collet portions in operative position.

16. Apparatus as defined in claim 15 wherein the space in said spindle comprises an annular groove defining a load reaction shoulder, the radially outwardly extending portion of said collet portions comprising a radially outwardly extending flange defining a shoulder engaging said load reaction shoulder.

17. Apparatus as defined in claim 1, including means for providing hydrostatic bearing means for said journal surfaces, said hydrostatic bearing means including a plurality of individual, substantially radial metering passages.

18. Apparatus as defined in claim 17 including an annular space disposed between the inner ends of said individual radial passages and the associated journal surfaces.

19. Apparatus as defined in claim 17 wherein said means for introducing fluid between said pistons includes additional metering passages disposed between said first-mentioned passages and being in communication with the space between said pistons.

20. Apparatus as defined in claim 17 wherein said metering passages are disposed adjacent the medial portion of each of said journal surfaces.

21. Apparatus as defined in claim 8, including means for providing hydrostatic bearing means for said journal surfaces, said hydrostatic bearing means including a plurality of individual, substantially radial metering passages.

22. Apparatus as defined in claim 21 including an annular space disposed between the inner ends of said individual radial passages and the associated journal surfaces.

23. Apparatus as defined in claim 21 wherein said means for introducing fluid between said pistons includes additional metering passages disposed between said first-mentioned passages and being in communication with the space between said pistons.

24. Apparatus as defined in claim 21 wherein said metering passages are disposed adjacent the medial portion of each of said journal surfaces.

* * * * *